United States Patent
Zhang

(10) Patent No.: US 7,167,723 B2
(45) Date of Patent: Jan. 23, 2007

(54) DUAL CHANNEL REDUNDANT FIXED WIRELESS NETWORK LINK, AND METHOD THEREFORE

(76) Inventor: Franklin Zhigang Zhang, 4808 Laurette St., Torrance, CA (US) 90503

( * ) Notice: Subject to any disclaimer, the term of this patent is extended or adjusted under 35 U.S.C. 154(b) by 559 days.

(21) Appl. No.: 09/995,506

(22) Filed: Nov. 27, 2001

(65) Prior Publication Data

US 2002/0065053 A1    May 30, 2002

Related U.S. Application Data

(60) Provisional application No. 60/253,205, filed on Nov. 27, 2000.

(51) Int. Cl.
*H04M 1/00* (2006.01)

(52) U.S. Cl. ............... 455/554.2; 455/426.2; 455/445; 455/403

(58) Field of Classification Search ........ 455/8, 455/9, 11.1, 78, 554.2, 426.2, 403, 445, 554, 455/422

See application file for complete search history.

(56) References Cited

U.S. PATENT DOCUMENTS

| | | | |
|---|---|---|---|
| 5,546,397 A * | 8/1996 | Mahany ............. | 370/310 |
| 6,587,441 B1 * | 7/2003 | Urban et al. ........ | 370/310 |
| 6,590,884 B1 * | 7/2003 | Panasik ............. | 370/338 |
| 6,659,947 B1 * | 12/2003 | Carter et al. ........ | 600/300 |
| 6,665,536 B1 * | 12/2003 | Mahany ............. | 455/434 |
| 2004/0166895 A1 * | 8/2004 | Koenck et al. ...... | 455/556.1 |

* cited by examiner

Primary Examiner—Matthew D. Anderson
Assistant Examiner—Tuan Pham

(57) ABSTRACT

A dual channel redundant wireless network link formed by the Redundant Fixed Wireless Network Link device 10 of the present invention provides a very high reliable network element for mission critical wireless network application. Redundant Fixed Wireless Link device (10) with two wireless networking radio channel (11, 12) turned on simultaneously, and running networking service feature is working as Service Equipment (SE). Both wireless networking radio channel (11, 12) of the SE have the same directional wireless network coverage area. The two wireless networking radio channels (11, 12) are separated by cross polarization of antenna at same radio frequency, or different radio frequency characteristics. One Redundant Fixed Wireless Link device (10) with one of its two wireless networking radio channel (11, 12) turned on and communicating with said SE, and loaded with networking client feature is acting as Client Equipment (CE). The link quality monitor feature of the CE is monitoring the communication link between the SE and CE. When the current link quality is low or the link is down, the CE automatically switches on the alternate wireless networking radio channel (11, 12) to maintain the network communication between the SE and CE. One SE may communicate with plurality of CE in the same wireless network coverage area.

5 Claims, 8 Drawing Sheets

DUAL CHANNEL REDUNDANT FIXED WIRELESS NETWORK LINK, AND METHOD THEREFORE

CROSS-REFERENCE TO RELATED APPLICATIONS

This application claims the benefit of the Provisional Patent Application Ser. No. 60/253,205 filed Nov. 27, 2000.

BACKGROUND

1. Field of Invention

This invention relates to wireless network communicating link, specifically to redundant wireless network link formed by redundant wireless network devices.

2. Description of Prior Art

Wireless communication system utilizes electro-magnetic wave as media to carry messages in between transmitting and receiving devices. In the art of fixed wireless networking, two wireless network equipments communicating to each other form a wireless network link. The wireless network link links the two networks that behind the wireless network equipments. Electro-magnetic wave propagating in the free space may be affected by many factors. Thus causes the quality of the wireless network link unstable. Furthermore, wireless networking radio hardware malfunction often causes wireless network communication link to be at poor quality, or even broken.

Fixed wireless networking is a duplex digital data networking system. Normally people deploy point to point and/or point to multi-point network with one Access Point (AP) communicating to the far end Subscribe Unit (SU) devices. To build an outdoor wireless network, people need to build a POP site on top of a high building or a tower, of which, a POP may comprise one or more APs and other network devices, such as router and/or ATM switch. The APs communicate to one or more far end SUs form point to point and/or point to multi-point wireless network links.

AP, SU type of wireless network has no redundancy feature. Partially link optimization can be achieved by turn on the choosing preferred AP function of the SU.

In the prior art of fixed outdoor wireless networking, the network device AP and SU are single channel devices. Network redundancy cannot be achieved. Turning on the SU feature of choosing preferred AP, increases the complexity of the network and causes the network unstable or fail.

Hardware failure will cause the communication between AP and SU cease; an unexpected interference at current wireless channel will also cause the communication between AP and SU to be unstable or cease. When link failure happens, it is impossible to keep the current communication between AP and SU until manual maintenance and hardware replacement. Obviously, this type of wireless network system cannot be used in mission critical applications.

SUMMARY

A redundant wireless network link comprises two Dual Channel Redundant Fixed Wireless Link (RFWL) devices. One of them is running as a Service Equipment (SE) with two of its wireless network radio units turned on and both antennas attached to the radio units having the same coverage area. The other (RFWL) device is running as Client Equipment (CE) with one of its wireless networking radio turned on and communicating with SE. The link quality monitoring features of CE is monitoring the link performance of the communicating radio unit. When link quality is below requirement, or link was down for any reason, CE will automatically switch the communication with SE to the alternate wireless network radio unit, thus to keep the communication between SE and CE continuously. A wireless network radio unit and the antenna attached to it is a wireless network channel. A RFWL device comprises two independence wireless channels, which do not interfere to each other because of cross polarization of the antennas and/or totally running at different wireless characters.

OBJECTS AND ADVANTAGES

Accordingly, one object and advantage of the invention is to provide high reliable redundant wireless network link, which comprises two Dual Channel Redundant Fixed Wireless Link (RFWL) devices.

Other objects and advantages are to provide a method of automatically monitoring the link quality at physical layer and the network performance at second layer (referencing ISO networking model), and switching to alternated channel to keep the wireless link communicating in best condition and continuously when RF or hardware hazard happens.

Further objects and advantages are to provide wireless network connectivity to high reliability demand area; to provide simple network management and improve maintainability of the wireless network; to provide low cost in wireless networking operation.

Additional objects and advantages will become apparent from a consideration of the ensuing description and the accompanying drawings.

DESCRIPTION—PREFERRED EMBODIMENT

Figure 1:
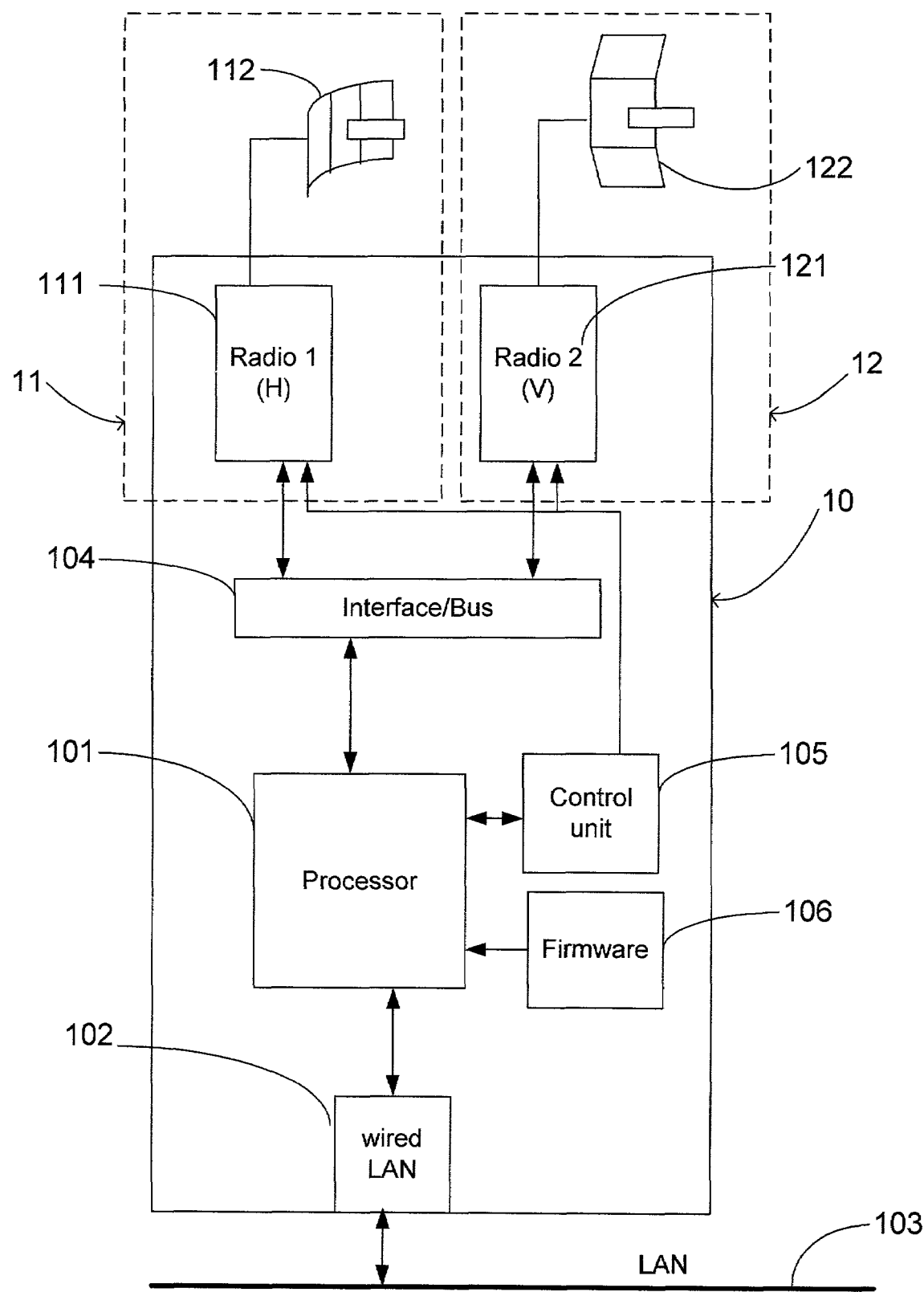
FIG. 1 shows a block diagram of the device with dual channel radio units and redundant wireless communication control function.

FIG. 1 illustrates a block diagram of the Redundant Fixed Wireless Network Link device 10 with two individual wireless networking radio channels 11, 12, among which, radio 111 and radio 121 are connected to processor 101 via interface/bus 104, radio 111 and radio 121 can be the same or different type of radios. Antenna 112 and antenna 122 can be the same or different type of antennas. If radio 111 and radio 121 are working at the same frequency band, then antenna 112 is working at horizontal polarization; meanwhile, antenna 122 is working at vertical polarization. If radio 111 and radio 121 are working at different frequency band, then the antenna 112 and antenna 122 do not have to work at different polarizations. Normally, different polarizations for Redundant Fixed Wireless Network Link device 10 are preferred. The wired LAN unit 102 is a connection port to connect the whole device 10 to the LAN 103. The control unit 105 will control the activity of radio units, such as hardware turn on/off, and any other performance related operations. The firmware unit 106 contains the software that is necessary to configure the device to be Service Equipment (SE) type of radio function or Client Equipment (CE) type of radio function, and, the redundant function software is needed in accordance.

Figure 2:
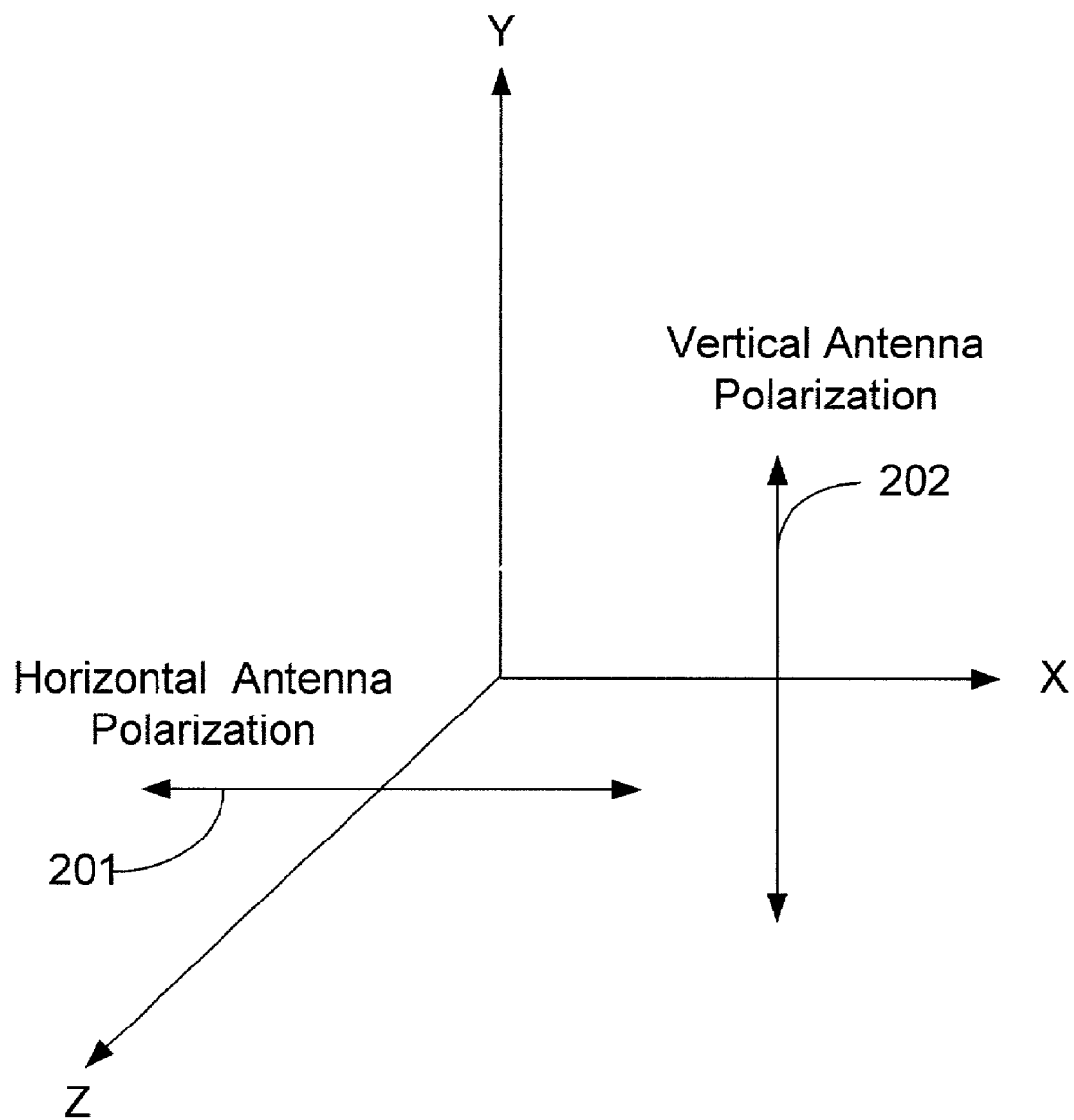
FIG. 2 shows the vertical and horizontal polarization of antenna.

FIG. 2 illustrates the vertical and horizontal polarization of antennas. The channel 11 of Redundant Fixed Wireless Network Link device 10 is working at horizontal polarization 201, in particularly, the antenna 112 is working at horizontal polarization 201. The channel 12 of redundant wireless communication control function device 10 is working at vertical polarization 202, in particularly, the antenna 122 is working at vertical polarization 202.

Figure 3:
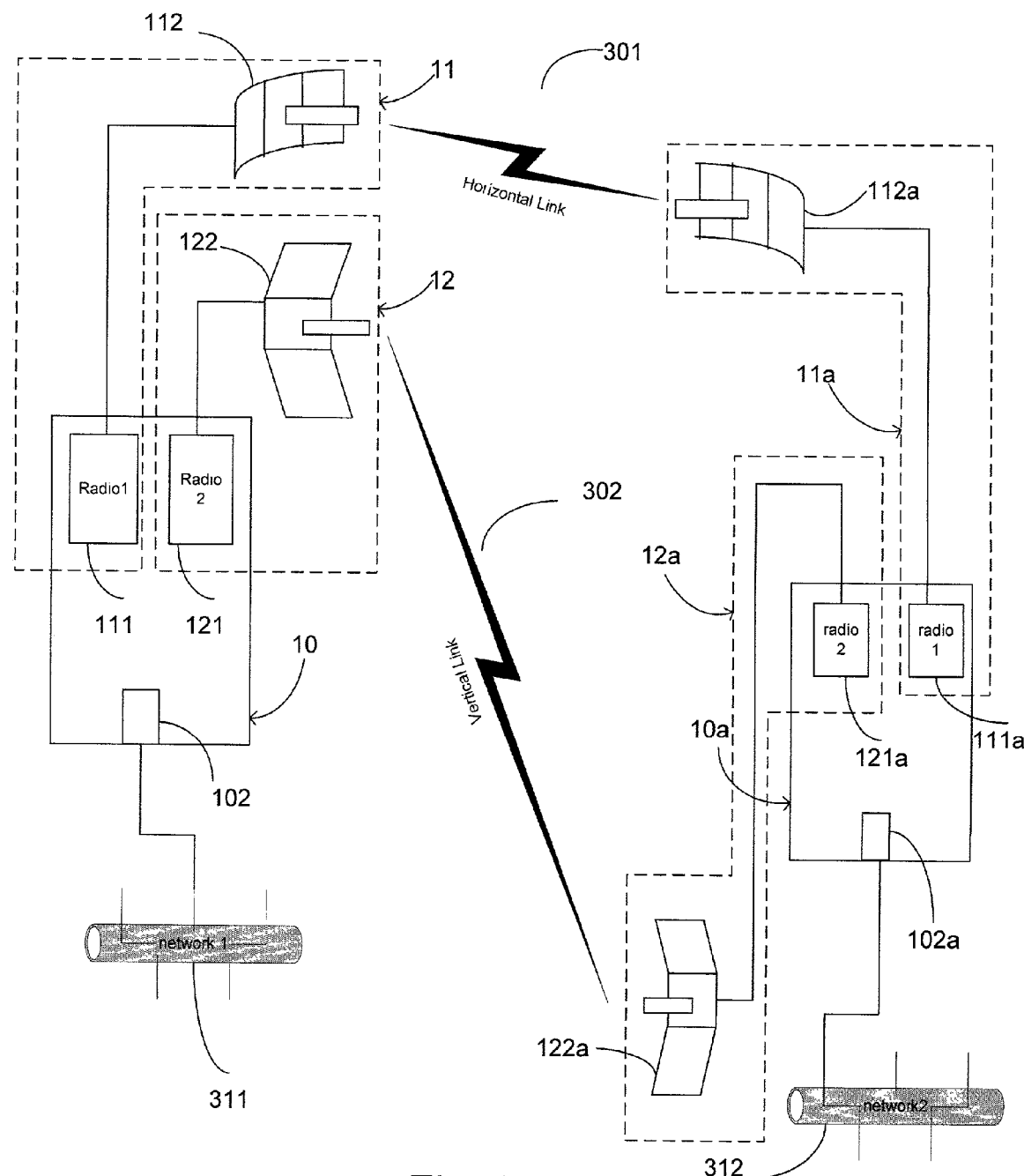
FIG. 3 shows a typical point-to-point wireless link with present invention of Dual Channel Redundant Fixed Wireless Network Link.

FIG. 3 illustrates a typical point-to-point wireless link with present invention of RFWL devices 10&10a. In which, the radio channel 11 (radio 111 and antenna 112) of RFWL device 10 is configured to work at horizontal polarization 201; the radio channel 11a (radio 111a and antenna 112a) of RFWL device 10a is configured to work at horizontal polarization 201; Antenna 112 and antenna 112a are communicating to each other and form a horizontal wireless link 301. The radio channel 12 (radio 121 and antenna 122) of RFWL device 10 is configured to work at vertical polarization 202; the radio channel 12a (radio 121a and antenna 122a) of RFWL device 10a is configured to work at vertical polarization 202; Antenna 122 and antenna 122a are communicating to each other and form a vertical wireless link 302. The RFWL device 10 is connected to network 311 via wired port 102. The RFWL device 10a is connected to network 312 via wired port 102a. Thus, the network 311 and 312 are linked together by the RFWL devices 10 and 10a with redundant wireless links 301 and 302. Between wireless links 301 and 302, one of them is configured to work as a primarily link; the other link is the redundant link. Once the primarily link performance is unqualified or failed, the system will switch to the redundant link, so as to keep the two networks connected continuously.

Figure 4:
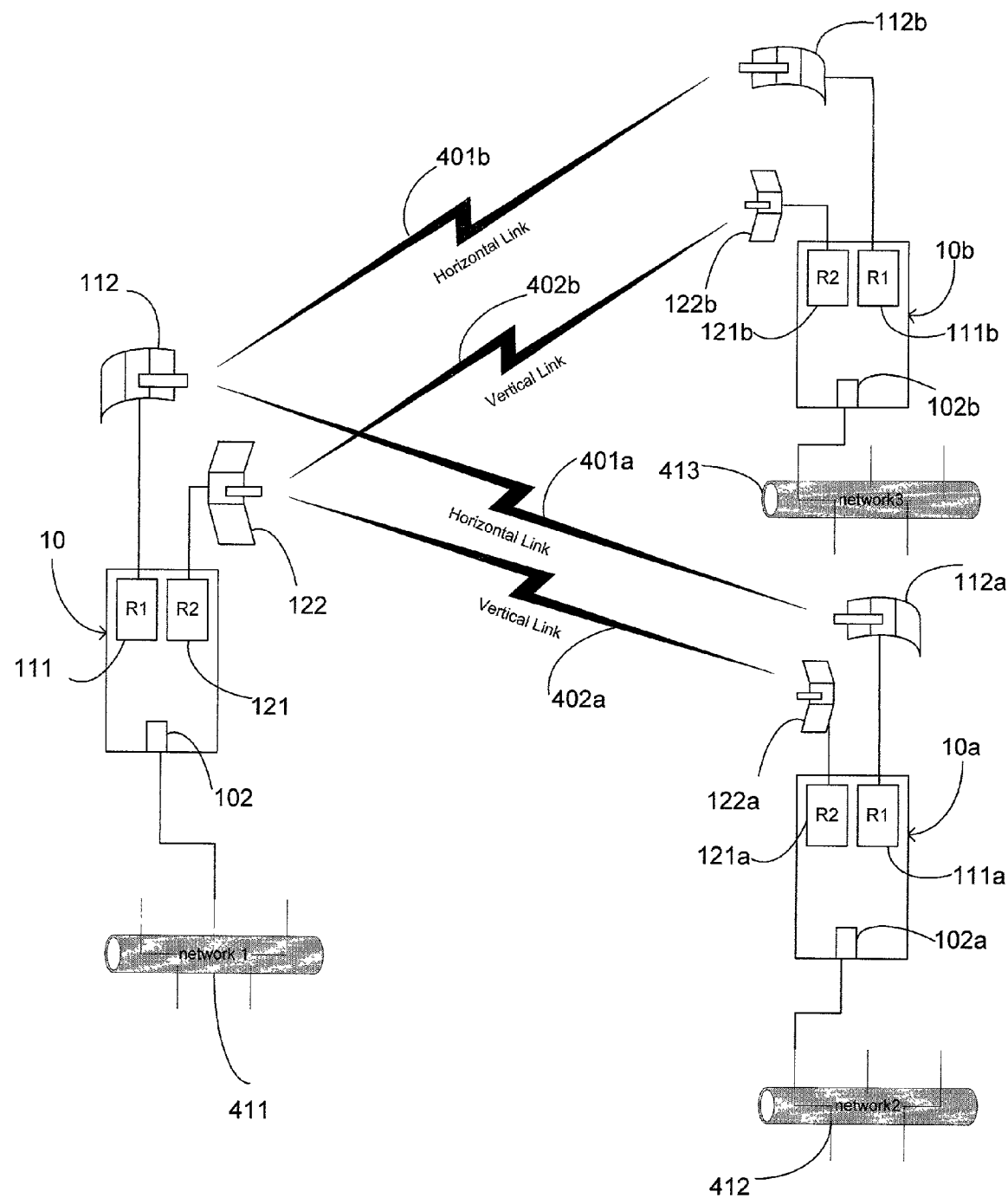
FIG. 4 shows a typical point-to-multipoint wireless links with present invention of Dual Channel Redundant Fixed Wireless Network Link.

FIG. 4 illustrates a typical point-to-multipoint wireless links with present invention. Among which, the radio channel 11 (radio 111 and antenna 112) of the RFWL device 10, the radio channel 11a (radio 111a and antenna 112a) of the RFWL device 10a and the radio channel 11b (radio 111b and antenna 112b) of the RFWL device 10b are configured to work at horizontal polarization 201; Antenna 112 is communicating with antenna 112a and 112b to form the horizontal links 401a and 401b. The radio channel 12 (radio 121 and antenna 122) of the RFWL device 10, the radio channel 12a (radio 121a and antenna 122a) of the RFWL device 10a and the radio channel 12b (radio 121b and antenna 122b) of the RFWL device 10b are configured to work at vertical polarization 202; Antenna 122 is communicating with antenna 122a and 122b to form the vertical links 402a and 402b. The RFWL device 10 is connected to network 411 via wired port 102. The RFWL device 10a is connected to network 412 via wired port 102a. The RFWL device 10b is connected to network 413 via wired port 102b. Thus, the network 411 and 412 are linked together by the RFWL devices 10 and 10a with redundant wireless links 401a and 402a; The network 411 and 413 are linked together by the RFWL devices 10 and 10b with redundant wireless links 401b and 402b. Between wireless links 401a and 402a, one of them will be configured to work as a primarily link; the other link will be the redundant link. Once the primarily link performance is unqualified or failed, the system will switch to the other link, so as to keep the two networks connected continuously. Between wireless links 401b and 402b, one of them will be configured to work as a primarily link; the other link will be the redundant link. Once the primarily link performance is unqualified or failed, the system will switch to the other link to keep the two networks connected continuously. In this embodiment, the RFWL device 10 is configured to work as the Service Equipment (SE), the RFWL devices 10a and 10b are configured to work as Client Equipment (CE). Even though, there are only 2 CEs show up in this embodiment, the number of CE of a real deployment can be more than two.

Preferred Embodiment—Operation

The operation of the present invention comprises link setup and smart redundancy. One RFWL device 10 is configured to be the Service Equipment (SE) to provide the wireless network coverage; and, one or multiple RFWL devices 10 are configured as Client Equipment (CE) to communicate to SE. The two wireless radio channels are configured with cross polarization antennas to minimize the cross interference between the two channels. CE is configured to be able to communicate with SE in both radio channels, one of the two channels is working as primary channel to communicate SE, the other is the back up alternate channel. Once started, the monitoring function of the CE is responsible to handle the redundancy functions.

Figure 5:
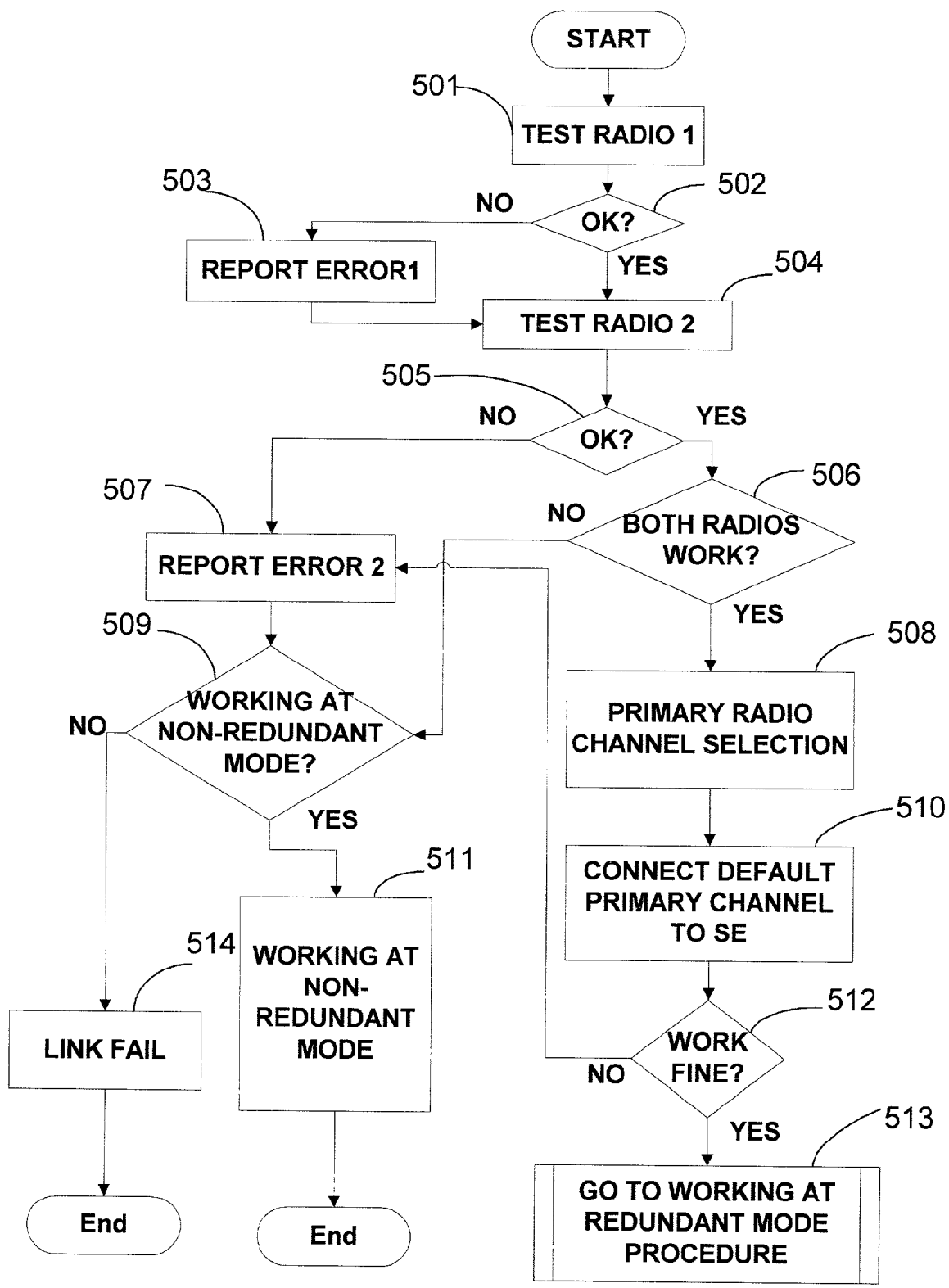
FIG. 5 is a flow chart of the initialization of the wireless link of the Client Equipment (CE) in the present invention.

FIG. 5 illustrates a flow chart of the initialization of the wireless link of the Client Equipment (CE) of present invention.

In this embodiment of initializing a RFWL device 10 is working at redundant mode. The processor will test the radio1 501, if it is functional, the processor will continue to test radio2 504, if radio1 is not functional, the processor will report error1 503, and then go to test radio2 504. If the radio2 test result 505 is not ok, the system will report error2 507 and go to check if CE is able and allowed to work at non-redundant mode 509 If the radio2 test result 505 is ok, the system needs to make sure if the both radios work fine 506 If only one of the radios is ok, the system will go to check if CE is able and allowed to work at non-redundant mode 509 If CE is able and allowed to work at non-redundant mode 509, system will work at non-redundant mode 511; If CE is not able and allowed to work at non-redundant mode 509, the system will perform at link fail status 514. If both radios work fine 506, the system will select the primary radio channel 508. Then system will connect the primary radio channel to SE 510. If the communication via primary radio channel to SE works fine, system will work at redundant mode 513. If the communication via primary radio channel to SE does not work well, system will report error2 507, and then process to check if CE is able and allowed to work at non-redundant mode 509, and so on.

Figure 6:
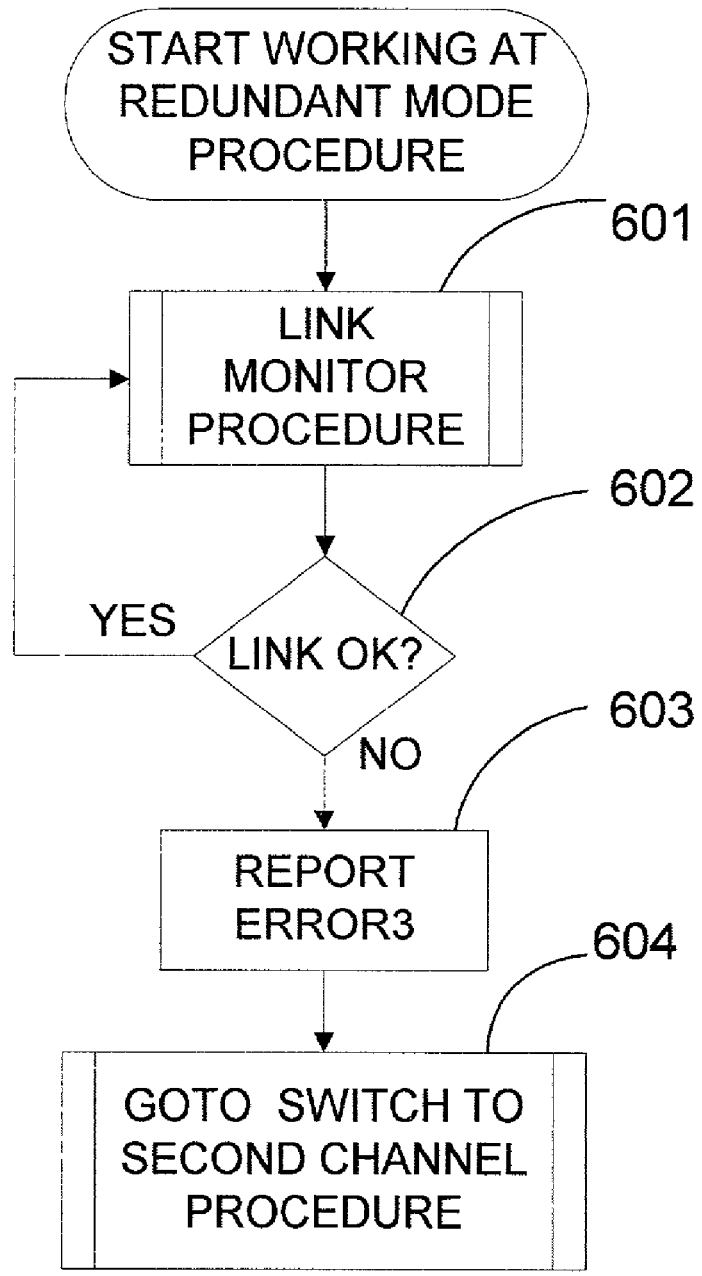
FIG. 6 is the procedure of the wireless link of the Client Equipment (CE) working at redundant mode.

FIG. 6 illustrates a flow chart of start working at redundant mode procedure of the wireless link of the Client Equipment (CE) of present invention.

When redundant mode procedure starts, system will perform the link monitor procedure 601, and then check if the link is good 602. If the link is good, the system will continue to link monitor procedure, and so on, once the link is not good, the link monitor procedure will report error3 603, and then go to switch to the second radio channel procedure 604.

Figure 7:
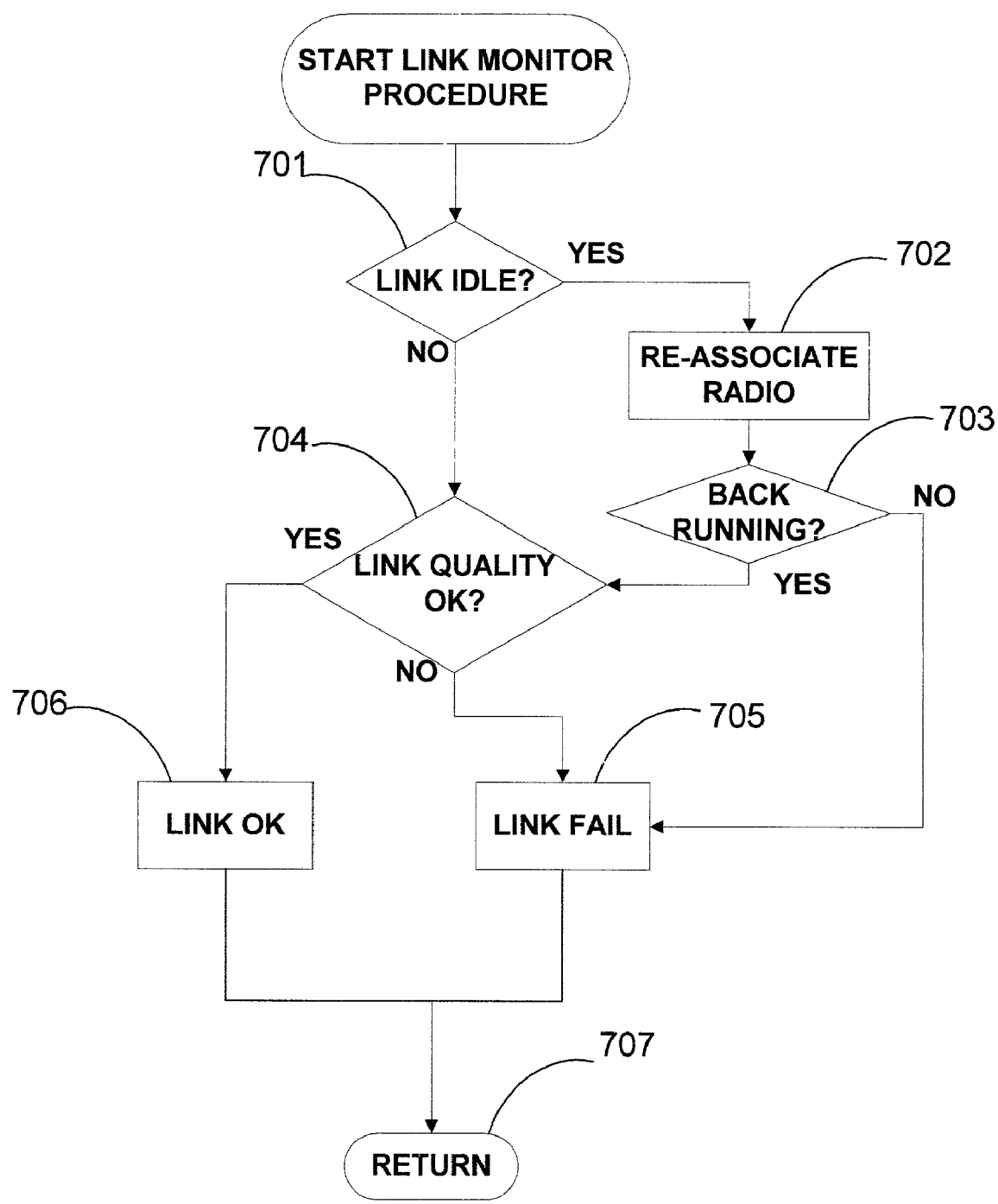
FIG. 7 is a flow chart of the link monitor procedure of the wireless link of the Client Equipment (CE) in the present invention.

FIG. 7 illustrates a flow chart of link monitor procedure of the present invention.

In this embodiment, when link monitor procedure starts, system will check if the link is idle 701 If the link is not idle, system will perform the link quality check 704; if the link is idle, system will re-associate the radio 702, and then if the link is back up running 703 If the link is back up running, system will perform the link quality check 704; If the link is not back up running, system will perform the link fail operation 705, and then return 707 with the link status. The link quality check 704 is good, the system will perform the link ok 706 operation and then return 707 with the link status; If the link quality is not good, system will perform the link fail operation 705, and then return 707 with the link status.

Figure 8:
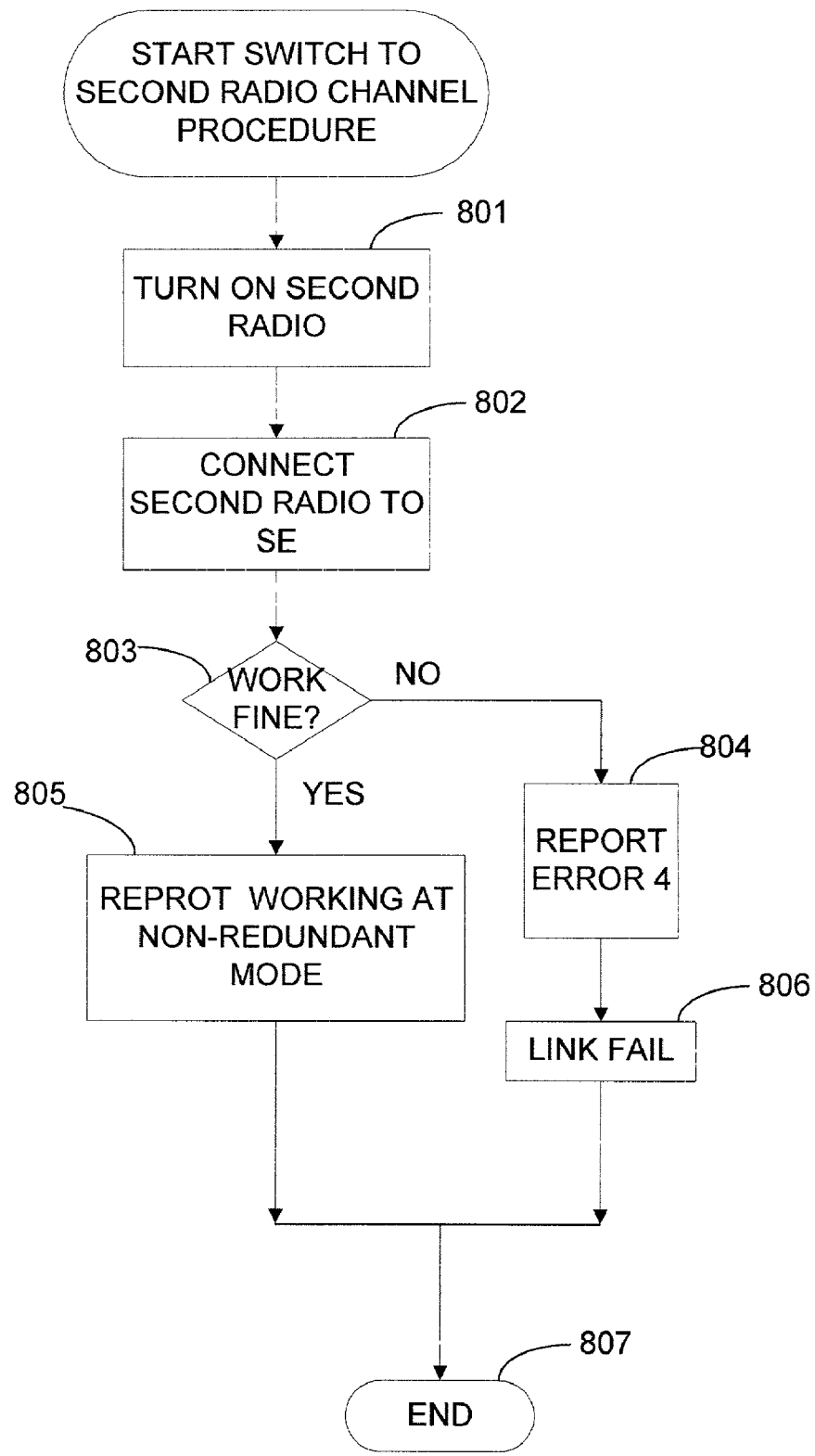
FIG. 8 is a flow chart of switching to second radio channel procedure of the wireless link of the Client Equipment (CE) in the present invention.

FIG. 8 illustrates a flow chart of switch to second radio channel procedure of the present invention.

In this embodiment, When switch to second radio channel procedure starts, system will turn on the second radio channel 801. Then, connect the second radio to SE 802. Check if the second communicating with SE is well 803 If the second radio communicates with SE well, system will report working at non-redundant mode 805, and then ends the redundant working mode 807; If the second radio does not communicate with SE well, system will report link fail 806, and then end the redundant working mode 807.

CONCLUSION, RAMIFICATIONS, AND SCOPE

Accordingly, it can be seen that I have provided a wireless network link with smart redundancy capability, which is capable of monitoring the link performance, and can switch to alternate wireless networking channel for better performance and/or redundancy when link is in poor quality or broken; a method of smart redundancy, which can automatically monitor the link quality, link status, switch the channel, and report the current working status. The redundancy of the present invention is base on two complete wireless networking channel, including wireless networking radio and antenna of both SE and CE, and the free air electro magnetic wave propagation environment in between the two antenna. In another words, any failure caused by any element of the communicating channel will be detected by the monitoring features and can trigger the redundancy. Furthermore, the Dual Channel Redundant Fixed Wireless Link (RFWL) and method have additional advantages in that:

The Redundant Fixed Wireless Network Link device 10 configured as SE can provide twice of the networking capacity at the same wireless network coverage area compare to the prior art. This multi-purpose design of redundancy and increasing capacity has a high efficient usage of the radio frequency of the wireless network.

The link quality monitor is capable of detecting the accumulated random interference by the statistic of the layer 11 network performance, and switch the radio channel.

The redundant wireless network link of the present invention greatly cut down maintains time and cost of the wireless network operation; provides a flexible timing schedule to service the problem link.

It is now possible to deploy the wireless network to reliability sensitive applications.

Although the description above contains many specificities, these should not be construed as limiting the scope of the invention but as merely providing illustrations of some of the presently preferred embodiments of this invention. Various other embodiments and ramifications are possible within its scope—For example, A redundant wireless network link can be formed by two of the wireless channel working at same frequency and same type of radio units with cross antenna polarizations.

A redundancy can have two totally different wireless networking radios, as far as the two channels are not interference to each other.

It is possible to deploy the dual Redundant Fixed Wireless Network Link in some environment to provide the mobile wireless networking connections.

Thus the scope of the invention should be determined by the appended claims and their legal equivalents, rather than by the examples given.

What is claimed is:

1. A point-to-point redundant fixed wireless network link comprising:
   two dual-channel redundant fixed wireless network link (RFWL) devices,
   two computer networks,
   wherein the RFWL device having two separate wireless networking radio units that can communicate with remote corresponding wireless networking radios forming a wireless networking sub-link via antenna means,
   wherein the RFWL device having one wired network interface for connecting to wired computer network,
   wherein the RFWL device having running redundant communication features means for communicating with remote RFWL device wirelessly,
   wherein one RFWL device operating as redundant wireless networking Service Equipment (SE),
   wherein other one RFWL device operating as redundant wireless networking Client Equipment (CE),
   wherein said SE and said CE each having wired networking port connecting to each one of said two computer networks,
   wherein said SE and said CE communicating to each other via antenna means forming a redundant wireless networking link,
   wherein said SE having two of its wireless networking radio units working simultaneously,
   wherein said CE having one of its wireless networking radio units communicating with the said SE via a primary link, the other one of its wireless networking radio units working at a redundant link and will automatically switch to communication with said SE if the primary link fails, and whereby said two computer networks communicating to each other wirelessly and redundantly via said redundant wireless networking link.

2. The point-to-point redundant fixed wireless network link of claim 1, wherein said RFWL device comprising two different types of wireless networking radios.

3. The point-to-point redundant fixed wireless network link of claim 1, wherein said RFWL device comprising two same type of wireless networking radios with antenna isolation means.

4. A method of redundant fixed wireless networking link, comprising:
   providing first dual-channel redundant fixed wireless network link device operating as Service Equipment (SE)

with antenna means, wherein said SE comprising two wireless networking radio units and one wired networking interface, providing second dual-channel redundant fixed wireless network link device operating as Client Equipment (CE), with antenna means, wherein said CE comprising two wireless networking radio units and one wired networking interface, providing first computer network connection to wired networking port of said SE, providing second computer network connection to wired networking port of said CE, setting said SE ready to communicate with two wireless networking channels to remote said CE, setting up said CE to communicate with said SE in one channel forming one primary link, running link quality monitoring function means in CE when link quality monitoring system detects the link quality of said primary link is below requirement or failed, and automatically switch to a redundant link for communicating with said SE, communicating said CE continually with said SE, keeping said first and second computer network communicating with each other continually via said SE and said CE.

5. A point-to-multi-point dual-channel redundant fixed wifeless network comprising:

a plurality of dual-channel redundant fixed wireless network link (RFWL) devices, a plurality of computer networks, wherein the RFWL device having two separate wireless networking radio units that can communicate with remote corresponding wireless networking radios forming a wireless networking sub-link via antenna means, wherein the RFWL device having one wired network interface for connecting to wired computer network, wherein the RFWL device having running redundant communication features means for communicating with remote RFWL device wirelessly, wherein the first one of said a plurality of RFWL device operating as redundant wireless networking Service Equipment (SE), wherein the rest of said a plurality of RFWL devices operating as redundant wireless networking Client Equipments (CEs), whereby said SE is connecting with first computer network of said a plurality of computer networks with its wired network interface, whereby said a plurality of CEs are connecting to the rest of said a plurality of computer networks with each corresponding wired network interface, wherein said SE is wirelessly and redundantly communicating with said plurality of CEs remotely forming one point-to-multi-point dual-channel redundant wireless network, wherein said CE having one of its wireless networking radio units communicating with said SE via a primary channel, the other one of its wireless networking radio units working at a redundant channel and will automatically switch to communication with said SE if the primary channel fails, and whereby said first computer network communicating with the rest of said plurality of computer networks via said point-to-multi-point dual channel redundant wireless network formed by the corresponding communicating SE and CEs.

* * * * *